UNITED STATES PATENT OFFICE.

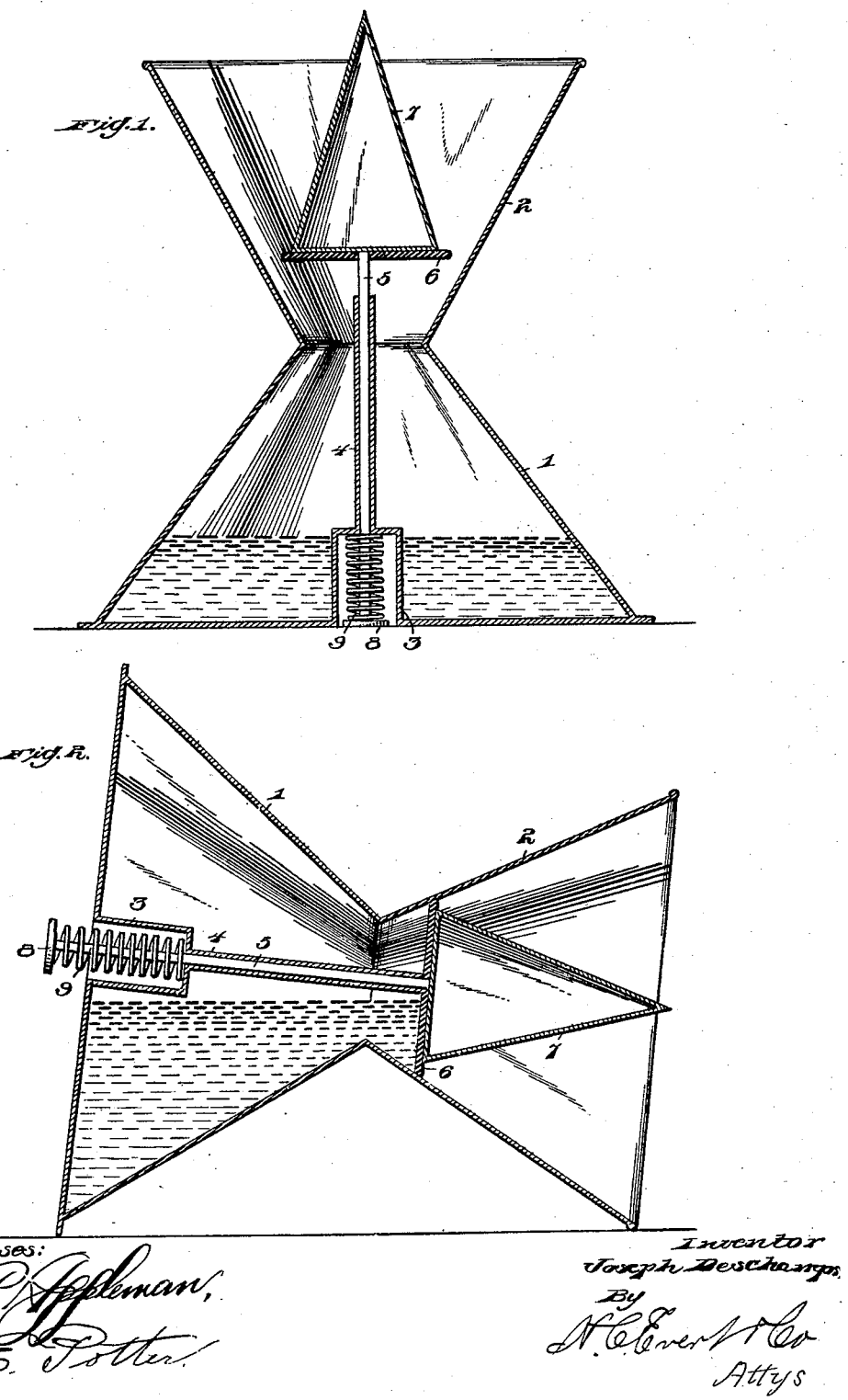

JOSEPH DESCHAMPS, OF HAZELHURST, PENNSYLVANIA.

CUSPIDOR.

SPECIFICATION forming part of Letters Patent No. 690,245, dated December 31, 1901.

Application filed June 12, 1901. Serial No. 64,248. (No model.)

*To all whom it may concern:*

Be it known that I, JOSEPH DESCHAMPS, a citizen of the United States of America, residing at Hazelhurst, in the county of McKean and State of Pennsylvania, have invented certain new and useful Improvements in Cuspidors, of which the following is a specification, reference being had therein to the accompanying drawings.

This invention relates to certain new and useful improvements in cuspidors, and relates more particularly to that class that will not spill when upset.

The invention has for its object the provision of novel means whereby the outlet of the cuspidor will be automatically closed when the vessel is tilted or upset; furthermore, to construct a device of this class that will be extremely simple in construction, strong, durable, and comparatively inexpensive to manufacture.

With the above and other objects in view the invention consists in the novel combination and arrangement of parts, to be hereinafter more fully described, and specifically pointed out in the claims.

In describing the invention in detail reference is had to the accompanying drawings, forming a part of this specification, wherein like numerals of reference indicate corresponding parts throughout both views, and in which—

Figure 1 is a vertical sectional view of my improved cuspidor, showing the same in an upright position. Fig. 2 is a similar view showing the cuspidor upset and the position of the parts when closed.

In the drawings the reference-numeral 1 indicates the body portion of the cuspidor, and 2 the bell-shaped mouth thereof. In the bottom of the body portion 1 is provided a tubular portion 3, carrying a contracted upwardly-extending tubular portion 4, which tubular extension is carried into the bell-shaped mouth 2.

The reference-numeral 5 represents a shaft, carrying on its upper end a gasket 6, upon said gasket and to the upper end of the shaft 5 being secured a cone 7. The lower end of said shaft 5 is provided with a washer 8. A spiral spring 9 encircles the lower end of the shaft 5 and is arranged between the washer 8 and the upper wall of the tubular portion 3.

When the cuspidor is in its normal position, as shown in Fig. 1, it will be easily filled and receive its contents through the bell-shaped mouth, which will allow it to pass between the inner walls of the bell-shaped mouth and the sides of the cone and gasket into the lower receptacle or body portion of the cuspidor. As soon as the cuspidor is tilted or upset the spiral spring 9 will expand, thereby operating the shaft 5 downwardly, the gasket and cone engaging the inner walls of the bell-shaped mouth and closing the opening, as fully illustrated in Fig. 2 of the drawings. It will be seen that by this arrangement it will be impossible to spill the contents of the cuspidor when upset or tilted.

When it is desired to clean the cuspidor, the washer 8 is removed from the shaft 5, also spiral spring is removed, which will permit the body portion of the cuspidor to be easily accessible for the purpose of cleaning.

The many advantages obtained by the use of my improved device will be readily apparent from the foregoing description, taken in connection with the accompanying drawings, and it will be noted that various changes may be made in the details of construction without departing from the general spirit of my invention.

Having fully described my invention, what I claim as new, and desire to secure by Letters Patent, is—

1. In a device of the character described, a body carrying a mouth, a tubular portion having a contracted upper portion arranged in the bottom of said body portion and communicating with the exterior thereof, a spring-pressed rod operating in said tubular portion and carrying a gasket on its upper end, a cone carried by the gasket, and a washer mounted on the lower end of said rod and normally engaging the floor, the said rod, when the body is upset, adapted to be released by the expansion of the spring and cause the said gasket to come in contact with the inner circumference of the mouth and prevent the contents from escaping.

2. In a device of the character described, a body portion having a bell-shaped mouth at the upper end thereof, a tubular portion carrying a contracted upper end forming a shoulder, a rod operating in said tubular portion, a spring encircling said rod and engaging said shoulder, a washer carried by the lower end of said rod and engaging said spring, and a gasket carried by the upper end of said rod and adapted to engage the inner circumference of said bell-shaped mouth when the said spring is released, substantially as described.

3. A cuspidor comprising a body portion carrying a mouth, a tubular portion centrally mounted on the bottom of said body portion and communicating with the exterior thereof, a spring-pressed rod mounted in said tubular portion, a washer carried by the lower end of said rod and normally in engagement with the floor, and a gasket of the same contour as said mouth rigidly secured to the upper end of said rod and adapted to engage the inner circumference of the mouth when said washer is out of engagement with the floor, substantially as described.

In testimony whereof I affix my signature in the presence of two witnesses.

JOSEPH DESCHAMPS.

Witnesses:
CHAS. MCKEAN,
J. A. HAYS.